United States Patent [19]
Kawano

[11] Patent Number: 5,325,143
[45] Date of Patent: Jun. 28, 1994

[54] ADAPTOR OF CAMERA
[75] Inventor: Kiyoshi Kawano, Tokyo, Japan
[73] Assignee: Asahi Kogaku Kogyo Kabushiki Kaisha, Tokyo, Japan
[21] Appl. No.: 825,532
[22] Filed: Jan. 24, 1992
[30] Foreign Application Priority Data
  Jan. 30, 1991 [JP] Japan .................. 3-014134[U]
[51] Int. Cl.⁵ .................. G03B 17/38; G03B 17/02
[52] U.S. Cl. ................... 354/266; 354/293; 354/288
[58] Field of Search ............ 354/266, 293, 295, 288, 354/67, 131

[56]  References Cited
  U.S. PATENT DOCUMENTS
  3,820,148  6/1974  Osanai .................. 354/295
  4,167,314  9/1979  Ichiyanagi et al. ...... 354/295 X
  4,232,958 11/1980  Fukahori et al. ........ 354/295 X
  4,441,801  4/1984  Mashimo et al. ......... 354/266 X
  4,592,635  6/1986  Vaughn ................. 354/266 X
  4,864,340  9/1989  Kaneko ................. 354/266
  4,937,604  6/1990  Yoshida et al. ......... 354/266

OTHER PUBLICATIONS
Revelant part of the brochure of "Canon Autoboy Zoom Super" Sep. 1989.
Revelant part of the brochure of "Nikon F4" Sep. 1989.

Primary Examiner—Michael L. Gellner
Assistant Examiner—Jae N. Noh
Attorney, Agent, or Firm—Kane, Dalsimer, Sullivan, Kurucz, Levy, Eisele and Richard

[57]  ABSTRACT

An adaptor of a camera including a mounting device for detachably mounting the adaptor to the bottom of a camera, a release switch, and a release signal transmitting device for releasing a shutter of the camera in accordance with the operation of the release switch.

6 Claims, 4 Drawing Sheets

ADAPTOR OF CAMERA

BACKGROUND OF THE INVENTION

1. Field of the Invention

The present invention relates to an adaptor (grip) which can be detachably attached to the bottom of a camera.

2. Description of Related Art

A shutter release switch (button) of a camera is usually provided on an upper left end portion of a camera body as viewed from the front. The location of the shutter release is most convenient for a right-handed person who takes a lateral picture (lateral photographing). However, the release switch is not always easily actuated when a right-handed photographer takes a longitudinal picture (vertical photographing). Namely, the position of the shutter release is determined, taking only lateral photographing, which is most frequently effected, into consideration. Vertical photographing which is rarely effected is not taken into account.

Furthermore, a conventional remote control which performs remote shutter releasing of a camera includes a transmitter which sends a remote release signal and a receiver, separate from the transmitter, which receives the remote release signal, wherein transmitter and receiver must be carried separately from the camera.

SUMMARY OF THE INVENTION

The primary object of the present invention is to provide an adaptor which can be detachably mounted to the bottom of a camera body to provide a grip on the camera which is particularly useful for vertical photographing.

Another object of the present invention is to provide an adaptor of a camera which has a remote releasing function and which can be detachably mounted to a camera.

To achieve the object mentioned above, according to the present invention, there is provided an adaptor of a camera comprising a mounting means for detachably mounting the adaptor to the bottom of a camera, a shutter release switch, and a release signal transmitting means for releasing the shutter of the camera in accordance with the operation of the release switch.

According to another aspect of the present invention, an adaptor of a camera comprises a mounting means for detachably mounting the adaptor to the bottom of a camera, a mounting portion to which a remote release signal transmitter for emitting a remote release signal is to be detachably attached, a remote release signal receiving means for receiving the remote release signal from the remote release signal transmitter which is separate from the mounting portion, a signal transmitting means for transmitting a signal from the adaptor to the camera, and a release circuit which releases the shutter of the camera in accordance with the remote release signal received by the release signal receiving means through the signal transmitting means.

The present disclosure relates to subject matter contained in Japanese utility model application No. 3-14134 (filed on Jan. 30, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
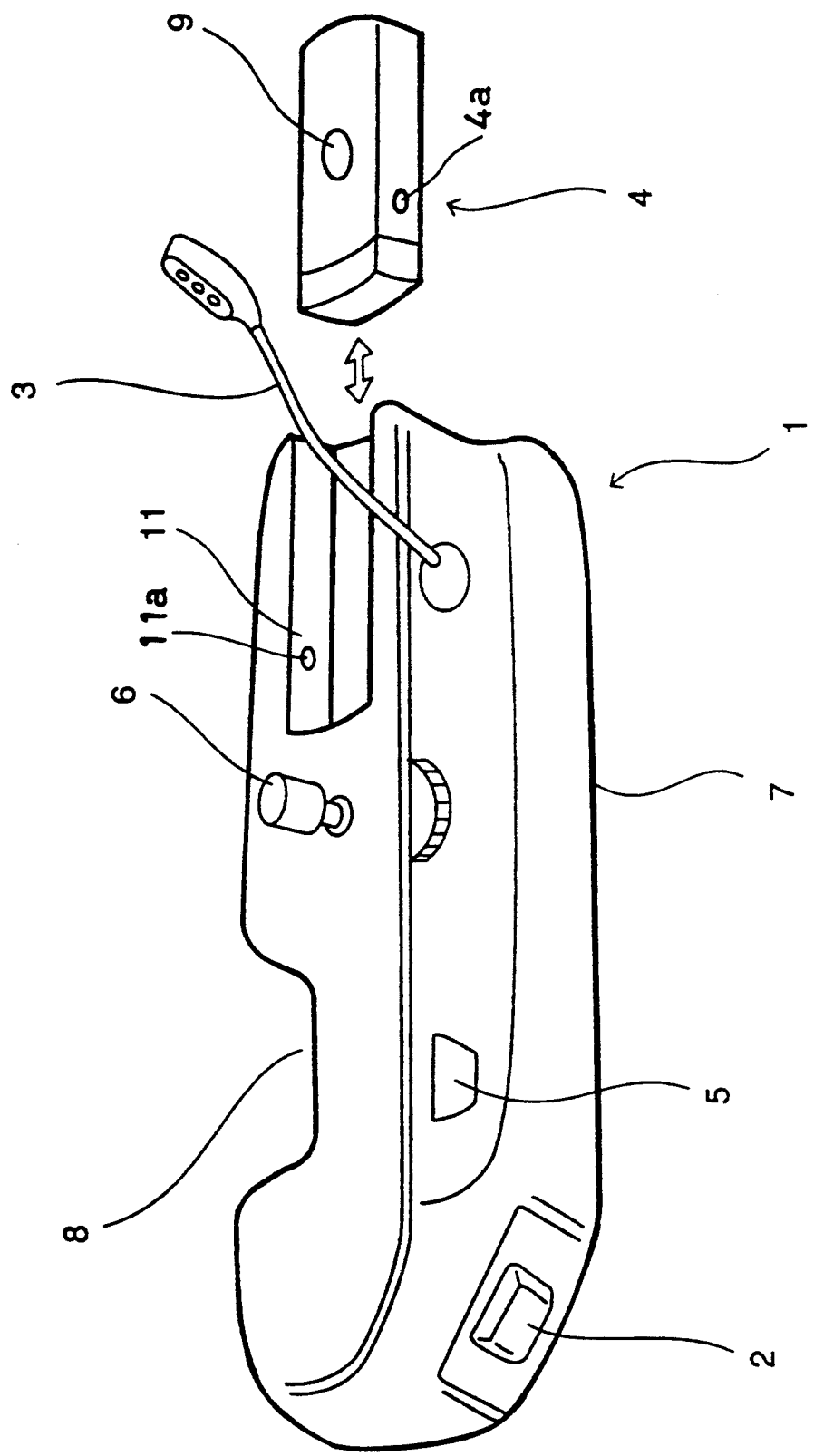
FIG. 1 is a perspective view of a camera adaptor of the present invention.

An adaptor (grip) 1 of a camera according to the present invention is detachably attached to the bottom of a camera body 21. To this end, the adaptor 1 is generally in the form of a plate having lateral width and thickness (in the forward and rearward direction) corresponding to the lateral width and thickness of the camera body 21. The adaptor 1 is provided with a male connector 6 (adaptor mounting screw) which is screwed in an associated tripod screw (not shown) of the camera body 21 and a female connector (threaded hole) 7 in which an associated male screw of a tripod (not shown) is engaged.

The adaptor 1 has thereon a release button 2 which is located on the lower left corner of the camera body 21 when the adaptor 1 is attached to the bottom of the camera body 21 through the adaptor mounting screw 6. The position of the release button 2 is convenient especially for vertical photographing. The adaptor 1 is provided on its front face with a release signal transmitting cable 3 and a remote release signal receiving window 5.

Also, the adaptor 1 is provided, on an upper surface thereof to be connected to the bottom surface of the camera body 21, with a recess 11 in which a separate remote release signal transmitter 4 is detachably fitted. The recess 11 has an open end through which the remote release signal transmitter 4 can be inserted and removed from the recess 11 even when the adaptor 1 is attached to the camera body 21.

The recess 11 and the signal transmitter 4 are provided with engaging members, such as a projection 11a and a depression 4a in which the projection 11a is fitted when the signal transmitter 4 is inserted in the recess 11 at a predetermined position, respectively.

The camera body 21 has a release socket 22 to which the release signal transmitting cable 3 is connected.

Figure 2:
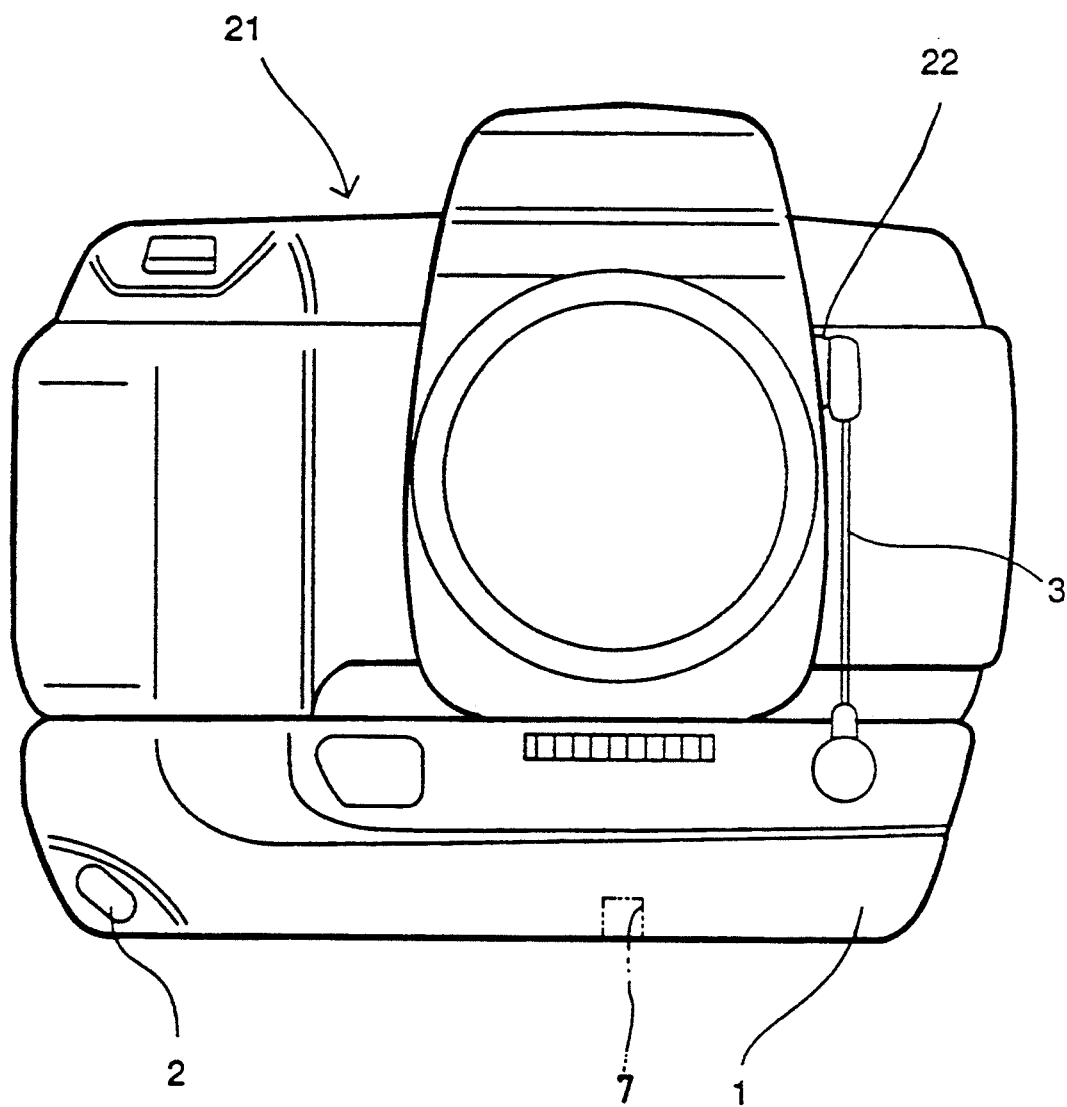
FIG. 2 is a front elevational view of a camera to which the adaptor of the present invention is attached.

The adaptor 1 is attached to the camera body 21 when vertical photographing is to be frequently used or when remote control is necessary, as shown in FIG. 2. The release signal transmitting cable 3 is connected to the release socket 22 of the camera body 21. In particular, when remote control is necessary, the remote release signal transmitter 4 having the release button 9 can be detached from the adaptor 1.

Figure 3:
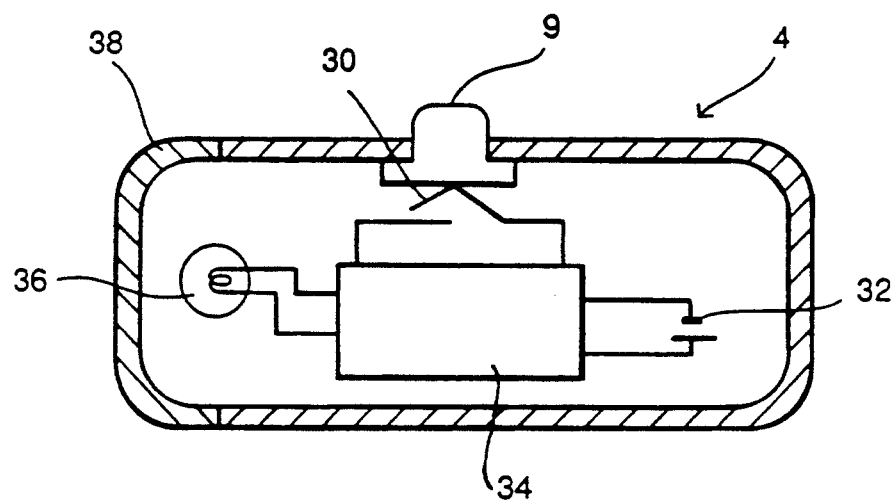
FIG. 3 is a schematic sectional view of a remote release transmitter according to the present invention.
Figure 4:
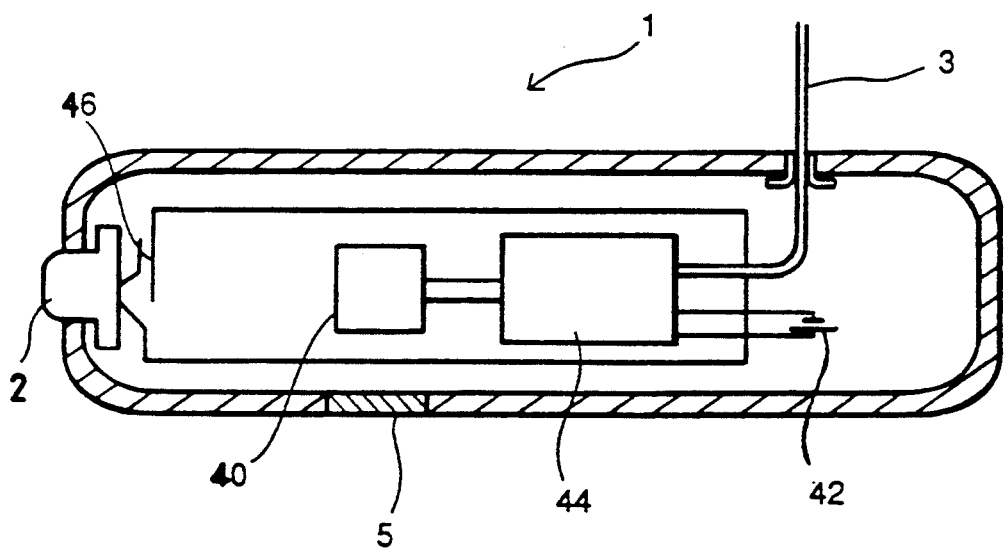
FIG. 4 is a schematic sectional view of an adaptor having a remote release receiver, according to the present invention; and, FIG. 5 is a front elevational view of a conventional camera.
Figure 5:
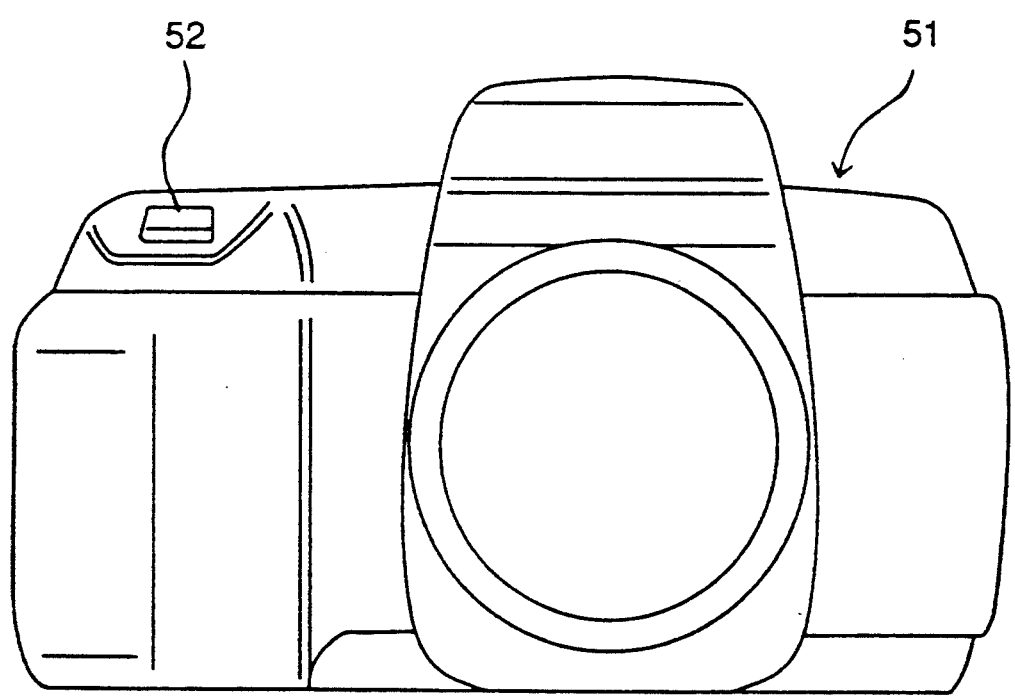

FIGS. 3 and 4 show sectioned internal constructions of the remote release signal transmitter (remote control transmitter) 4 and the adaptor 1 having therein a remote control signal receiver which receives the remote release signal from the remote release signal transmitter 4, respectively.

When the release button 9 of the remote release signal transmitter 4 is depressed, the switch 30 is turned ON, so that an infrared LED 36 connected to a lighting circuit 34 including a power source 32 is effected to emit the remote release signal through a window 38 formed on the remote release signal transmitter 4. An infrared light receiving sensor 40 of the adaptor receives the remote release signal from the remote release signal transmitter 4 through the remote release signal receiving window 5. The infrared light receiving sensor 40 is connected to a release circuit 44 including a power source 42, so that the remote release signal received by the infrared light receiving sensor 40 is sent to the camera body 21 through the release signal transmitting cable 3 to take a picture.

The release circuit 44 of the adaptor 1 is connected to a release button 2 for vertical photographing and a switch 46 which is turned ON to send the release signal to the camera body 21 when the release button 2 is pressed down. Note that although the switches 30 and 46 are both drawn as simple ON/OFF switches for simplification in FIGS. 3 and 4, they are in practicality two-step switches in which when depressed by a first step an object distance measuring signal is emitted, and when further depressed by a second step a release signal is emitted, as known per se.

Although the release signal transmitting and receiving means is constituted by the release signal transmitting cable 3 in the illustrated embodiment, it can be comprised of electrical contacts which are engaged when the adaptor 1 is attached to the camera body 21. The signal to be transmitted and received is not limited to infrared LED light, as a pulse signal of an infrared LED or a radio wave signal could be employed. Furthermore, it is possible to incorporate a zoom function for effecting the zooming of the camera lens in the remote release signal transmitter 4. Thus, when vertical photographing or remote control is necessary, the adaptor (grip) 1 is attached to the camera body 21, and upon normal photographing (horizontal photographing), the adaptor 1 can be removed from the camera body 21.

As can be seen from the foregoing, according to the present invention, the adaptor can be detachably attached to the camera body in accordance with need, particularly when vertical pictures are frequently taken, for example when pictures of a model are taken, or when a photographer wants to take a picture by using the remote control. Since the adaptor is removed from the camera body when it is not necessary, the adaptor does not increase the size and weight of the camera when doing normal photographing. Furthermore, the possibility of the remote release signal transmitter being lost is reduced.

I claim:

1. An adaptor of a camera comprising:
   a mounting means for detachably mounting said adapter to the bottom of said camera;
   a remote release signal transmitter for emitting a release signal;
   a mounting portion of said adaptor configured to detachably receive said remote release signal transmitter;
   a remote release signal receiving means on said adaptor for receiving a remote release signal emitted from said remote release signal transmitter;
   a release switch on said adaptor;
   a signal transmitting means for transmitting a release signal from said adaptor to said camera in response to an operation of said switch; and,
   a release circuit operatively connected to release a shutter of said camera in response to a release signal from said signal transmitting means when said adaptor is mounted to said camera.

2. An adaptor of a camera according to claim 1, wherein said release switch is located at the lower left corner of said camera as viewed from the front when said adaptor is attached to said camera.

3. An adaptor of a camera according to claim 1, wherein said release switch is located at the lower left corner of said camera as viewed from the front when said adaptor is attached to said camera.

4. An adaptor for a camera comprising:
   a mounting means for detachably mounting said adapter to the bottom of said camera;
   a release switch on said adaptor for releasing a shutter of said camera;
   a remote release signal transmitter;
   second mounting means for detachably mounting said remote release signal transmitting means to said adapter;
   a remote release signal receiver; and
   release signal transmitting means for transmitting a release signal from said remote single receiver or said adapter release switch to said camera shutter.

5. An adaptor of a camera according to claim 4, wherein said release switch is located at the lower left corner of said camera as viewed from the front when said adaptor is attached to the camera.

6. An adaptor of a camera according to claim 4 further comprising interengaging means on said remote release signal transmitter and said adaptor for locking said remote release signal transmitter in a predetermined position when the latter is attached to the adaptor.

* * * * *